US006981048B1

(12) United States Patent
Abdolbaghian et al.

(10) Patent No.: US 6,981,048 B1
(45) Date of Patent: Dec. 27, 2005

(54) KEEP-ALIVE MESSAGING WHEN TWO APPLICATIONS ARE RUNNING

(75) Inventors: Soheila Abdolbaghian, Irvine, CA (US); Tuan Nguyen, Laguna Hills, CA (US)

(73) Assignee: Toshiba America Information Systems, Inc., Irvine, CA (US)

( * ) Notice: Subject to any disclaimer, the term of this patent is extended or adjusted under 35 U.S.C. 154(b) by 563 days.

(21) Appl. No.: 09/721,498

(22) Filed: Nov. 22, 2000
(Under 37 CFR 1.47)

(51) Int. Cl.[7] .............................................. G06F 15/16
(52) U.S. Cl. ...................... 709/228; 709/203; 709/223; 709/227
(58) Field of Search ................................ 704/200–203, 704/223–228, 231–232; 714/51, 55, 4

(56) References Cited

U.S. PATENT DOCUMENTS 6,006,259 A * 12/1999 Adelman et al. ........... 709/223
6,112,320 A * 8/2000 Dien ........................... 714/51
6,134,588 A * 10/2000 Guenthner et al. ......... 709/226
6,434,612 B1 * 8/2002 Hughes et al. .............. 709/223
6,463,078 B1 * 10/2002 Engstrom et al. ........... 709/203
6,557,038 B1 * 4/2003 Becker et al. .............. 709/227
6,567,852 B2 * 5/2003 Besaw et al. ............... 709/228

* cited by examiner

*Primary Examiner*—Bharat Barot
(74) *Attorney, Agent, or Firm*—Pillsbury Winthrop Shaw Pittman LLP

(57) ABSTRACT

The present invention is generally directed to a system and method in which a second application (the "keep-alive function") sends a ping, message or other signal to a first application to prevent the first application from being timed out (hereinafter, "keep-alive input"). In an embodiment of the invention, the first application is queried as to the appropriate content and format of a timeout period restart message. The keep-alive function may be automatically executed upon the occurrence of a triggering event. The keep-alive function may, periodically or based on a timeout clock related to the first application, check the status of the first application and/or send a keep-alive input.

27 Claims, 4 Drawing Sheets

KEEP-ALIVE MESSAGING WHEN TWO APPLICATIONS ARE RUNNING

BACKGROUND

In general, a computer executing an application may terminate the application unless the computer senses a timeout period restart event, such as a keystroke, a mouse button click, pointer motion, touch screen activation, message receipt, ping signal receipt, or a like input. Reasons for terminating applications based on the absence of a timeout period restart event include conservation of RAM cache and memory, power and other computer resources, In a communications network with a client/connected computer architecture, communication between a client and a connected computer occurs in sessions, each of which is generally given a unique session identifier (SID). Each session may be associated with a unique client identifier or address (e.g., an Internet protocol address). During a session, the connected computer may receive from the client multiple service requests, each of which may relate to a number of applications. Applications, particularly those that utilize a large amount of connected computer or network resources (e.g., those that are memory-intensive), may have a timeout feature that terminates the application in a session if an application event is not sensed or a response to an information request is not received within a specified period of time.

Where a session includes multiple applications, a user operating on a client terminal may not respond to an information request or cause an application event because the application has been moved to the background of the client terminal and the user is actively working with a second application in the client terminal foreground. It is often undesirable to have the first application timeout in such situations.

Moreover, some applications prompt the user for a specified input prior to timing out the application. For example, applications that bill the user based on usage time often cause the client terminal to display a window asking the user if the user wants to maintain the application connection. The window may include an icon that may be activated to cause the terminal to send the application a message sufficient to avoid application timeout. Otherwise, application timeout proceeds as scheduled.

DETAILED DESCRIPTION

The present invention is generally directed to a system and method in which a second application (the "keep-alive function") sends a ping, message or other signal to a first application to prevent the first application from being timed out (hereinafter, "keep-alive input"). In an embodiment of the invention, the first application is queried as to the appropriate content and format of a timeout period restart message. The keep-alive function may be automatically executed upon the occurrence of a triggering event. The keep-alive function may, periodically or based on a timeout clock related to the first application, check the status of the first application and/or send a keep-alive input.

Figure 1:
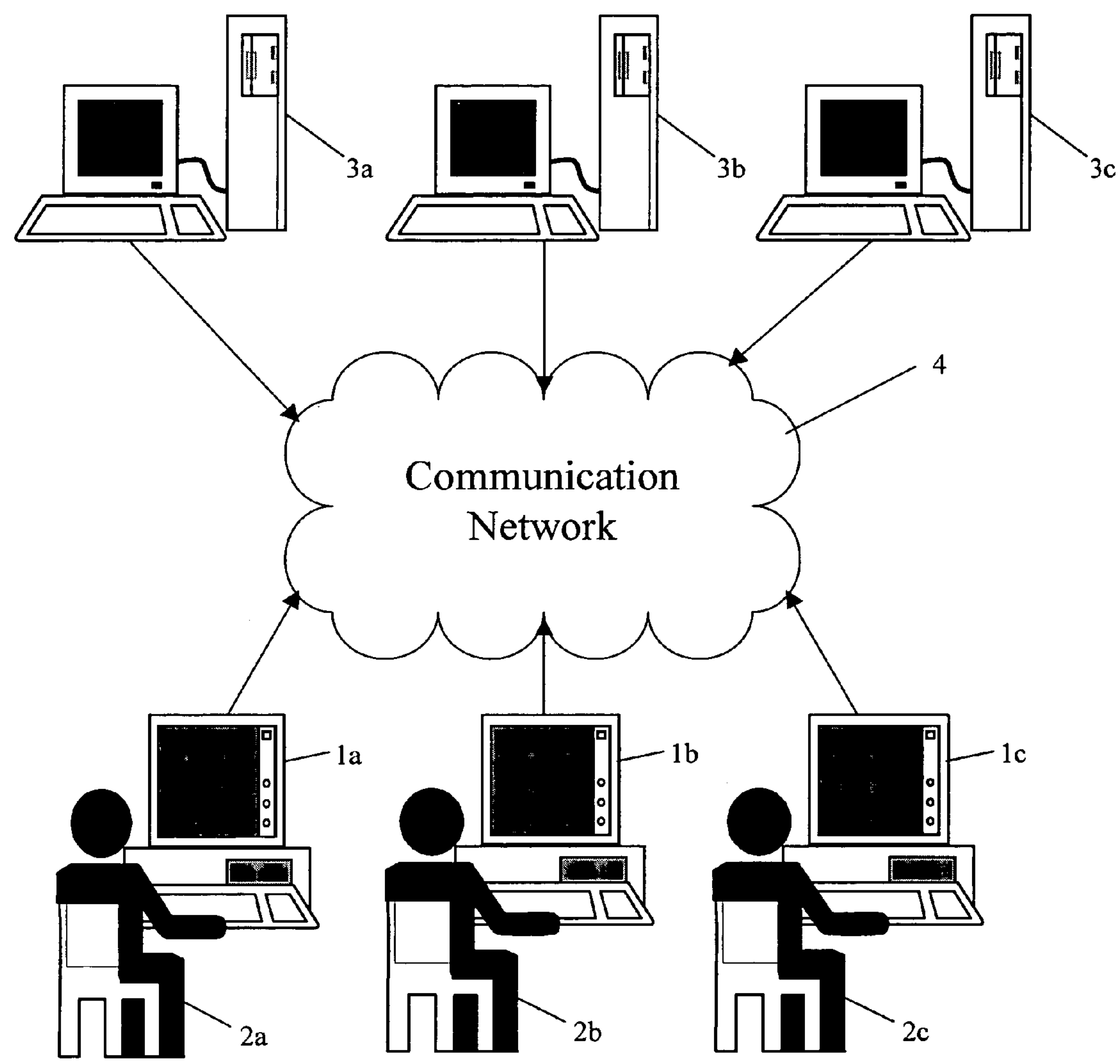
FIG. 1 depicts an embodiment of a communication network according to the present invention.

FIG. 1 depicts an embodiment of the system according to the present invention. User terminals 1*a*–1*c* (collectively, "user terminal 1") used by users 2*a*–2*c* (collectively, "user 2") may be connected to a communication network 4 so that the user terminal 1 may send signals, data, messages and the like to the connected computers 3*a*–3*c* (collectively, "connected computer 3") and receive the same from the connected computer 3. Other terminals may also be connected to the communication network 4. The user terminal 1 may have an operating system(s) which can be used to execute software applications. The user 2 may cause the user terminal 1 to execute various software applications, including for example, Web browser, word processor, spreadsheet, database, hardware driver, electronic mail, compiler, video or audio data player, customized software, network resource management, or other applications. The operating system for the user terminal 1 may be different from the operating system for the connected computer 3. Note that although the phrase "terminal" is used to describe the user terminal 1, the user terminal 1 may include a computer processor that is independent of the connected computer 3, allowing local execution of applications or portions thereof. The user terminal 1 may run applications either as desktop, foreground or background processes. In particular embodiments of the invention, the user terminal 1 may be connected to other terminals or computers in a local area network (LAN) and may be connected to the communication network 4 through a gateway or firewall.

The communication network 4 may be a local area network (LAN), metropolitan area network (MAN), wide area network (WAN), the Internet or any other type of computer network and may use any network implementation, including, for example, the Ethernet, ARCnet, Token Ring implementations. Information communicated over the communication network 4 may conform to any data communications protocol, including TCP/IP, IPX/SPX, NetBios and AppleTalk. The communication network 4 may include wire line (such as twisted-pair telephone wire, coaxial cable, electric power line, optical fiber wire, leased line or the like) or wireless (such as satellite, cellular, radio frequency or the like) connections.

In an embodiment of the invention, the user 2 may cause the connected computer 3 to execute a first software application using the user terminal 1 and may subsequently cause the connected computer 3 to execute a second software application. One or several copies of the software applications may reside on the connected computer 3. Alternatively, a software application may consist of discrete parts which are distributed between the connected computer 3 and the user terminal 1. Multiple copies of a particular software application, portions thereof, or shared or dedicated resources used by the application may be in use by different users simultaneously. The first software application may include a function (the "timeout function") whereby the application is terminated if the user 2 does not take some action or the user terminal 1 does not transmit a signal or message recognizable by the first application within a specified time period (the "timeout period"). This is a particularly useful feature when an application requires the use of shared memory, processor, data source or other resources.

In a particular embodiment of the invention, the connected computer 3 may be a server and the user terminal 1 may establish a client-server session with the connected computer 3 by transmitting a session request to the connected computer 3. The connected computer 3 may establish a session and return to the user terminal 1 a session identifier. A first application, e.g., the downloading of content associated with a particular Web page from a specified Web site, may be executed by the connected computer 3 within this session. While the first session is still active, the user 2 may decide to open a second application. The second application may also reside on the connected computer 3, may be local to the user terminal 1 (e.g., a desktop application), or may be shared between the two. For example, the second application may be the downloading of content associated with a second Web page from a different specified Web site. The user terminal 1 may detect when the user 2 requests that the second application be launched, for example, by detecting when the user activates a link embedded in a Web page, activates a screen icon, enters an application execution command, accesses an executable computer file, or the like. In another example, the second application may be a desktop application such as a word processing, spreadsheet, or printer driver application. In an embodiment of the invention, the second application may reside on a second connected computer that may communicate with the user terminal 1 over the communication network 4.

Figure 2:
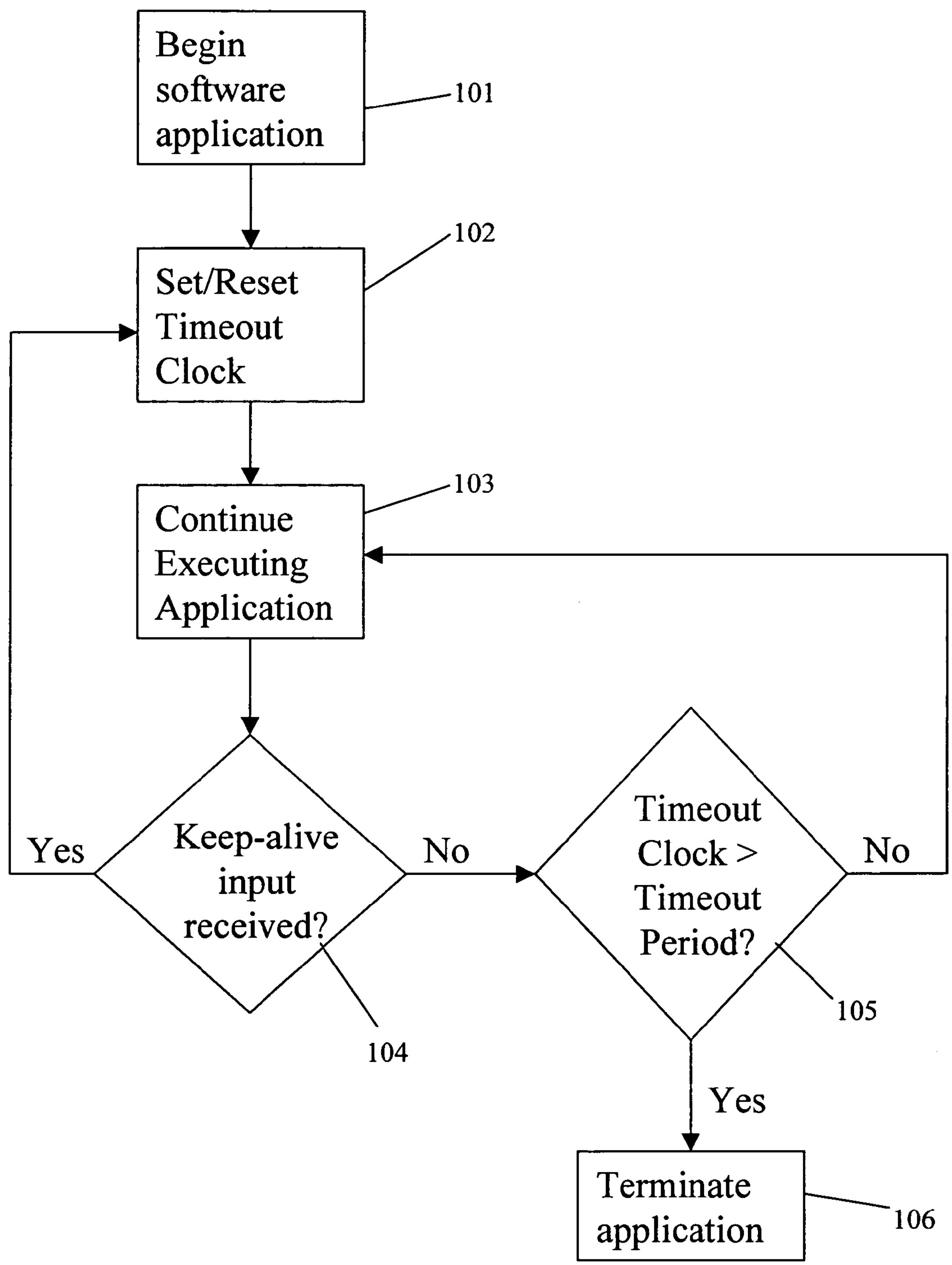
FIG. 2 is a flowchart illustrating the logical process that may be executed by a timeout function according to an embodiment of the present invention.

A timeout function associated with the first application may include performing the steps shown in the flowchart in FIG. 2. Block 101 shows execution of the application being started. This step may be performed by the application host, i.e., either the user terminal 1, the connected computer 3 or, for example, in the case of a distributed application, a combination of the two. At block 102, a timeout clock associated with the application may be set (where execution of the application is just beginning) or reset to an initial state to begin counting time. The timeout clock may count up, i.e., starting from an initial state of zero and periodically incrementing until the timeout period value is reached, or count down, i.e., starting from an initial state of the countdown period value and periodically decrementing until zero is reached. As shown in block 103, the application proceeds with normal execution of the application. This may include receiving input by, for example, causing the host to poll an input device or devices associated with the host. Alternatively, an input device or devices may create and transmit an interrupt signal when input is received. In an embodiment in which the application host is simultaneously executing multiple applications, the input may include a header identifying with which application the input is meant to be used.

In block 104, the application determines whether the input it has received is of a type meant to prevent timeout of the application, i.e., a "keep-alive input". The type of input necessary to keep the application alive may vary according to the application or may be selected by the user 2 or a system or network administrator. Possible keep-alive input may include simple periodic pings or be limited to specific input data messages. If a keep-alive input is received, the application returns to block 102 and resets the timeout clock to its initial state.

If a keep-alive input is not received, the application checks whether the timeout clock has exceeded a specified timeout period. The timeout period may be set by default or specified by the user 2, or a system or network administrator. If the timeout clock does not exceed the timeout period, the application returns to block 103 and continues to execute the application. However, if the timeout clock exceeds the timeout period value, the application terminates, as shown in block 106. In particular embodiments, termination block 106 may include steps for sending the user 2 a warning message that the application is about to be timed out. In these embodiments, the user 2 may be allowed to send a signal to the application requesting that the application not be timed out. In effect, in such an embodiment, block 106 may include sub-blocks similar to blocks 103, 104, and 105.

Figure 3:
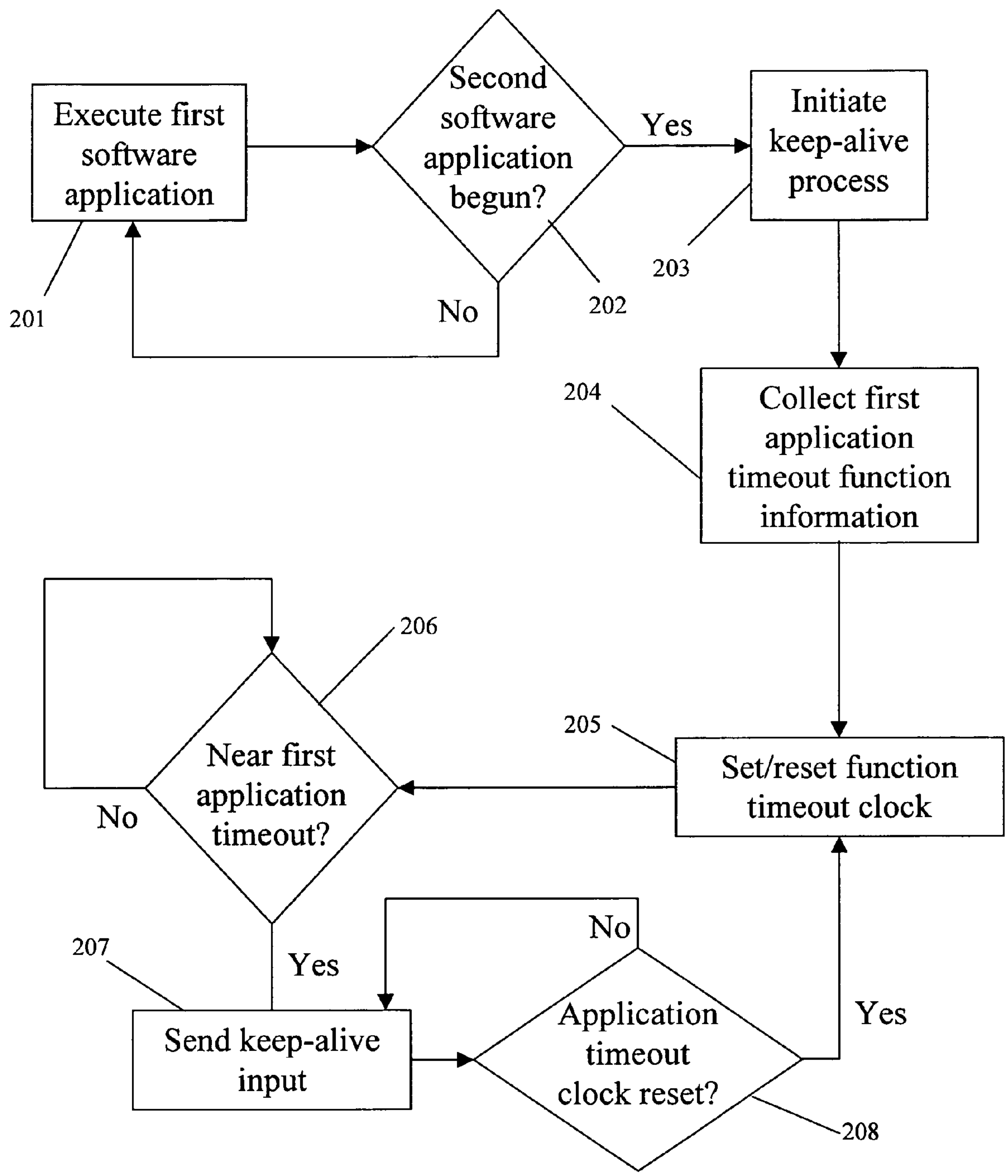
FIG. 3 is a flowchart illustrating the logical process that may be executed by a keep-alive process according to an embodiment of the present invention.

FIG. 3 depicts a flowchart describing the operation of an embodiment of the present invention in which a keep-alive input may be sent to prevent timeout of the first application.

According to this embodiment, there may be an application (the "keep-alive function") residing on a user terminal 1 or a connected computer 3 which is initiated (as shown in block 203) if the user has caused a first application to be launched (as shown in block 201) and subsequently, prior to termination of the first application, causes a second application to be launched (as shown in block 202). The keep-alive function need not reside on the same user terminal 1 or connected computer 3 as either the first or second application. In an embodiment of the invention, the user 2 may be asked whether the keep-alive process should be initiated and the keep-alive may be initiated only if the user 2 responds affirmatively to this inquiry.

In an embodiment of the invention, upon initiation, the keep-alive process may collect information about the timeout function associated with the first software application in block 204. This may be done by transmitting a request for such information to the application host for the first application, i.e., the connected computer 3. In a client-server session-based embodiment of the invention, the request may include the session identifier. In embodiments of the invention, the user terminal may access information identifying particular environment variables or parameters associated with the timeout function ("timeout parameters") for the first application and may include in the request the identity of the timeout parameters in the request. Alternatively, the request may be general and may be answered with information related to all environment variables and parameters. In such an embodiment, the keep-alive function may sort through the environment variable/parameter information to identify timeout parameters (if precisely known) or likely timeout parameters. Likely timeout parameters may include all parameters with the term "timeout" or some variation thereof in the parameter name. Likely timeout parameters may also be limited by the value type associated with the parameter.

For example, in an embodiment of the invention, the parameter for the duration of the timeout clock may be sought. However the precise name of the parameter associated with the duration of the timeout clock for the first application may not be known. The request transmitted to the connected computer 3 may yield a general response including all environment variables and/or parameters. From the returned environment variable/parameter information, the keep-alive function may identify only parameters with values that are numerical values as likely timeout parameters, since the value of the parameter associated with the duration of the timeout clock is likely to be a numerical value (such as an integer number equivalent to the number of seconds the timeout clock is supposed to count). Where multiple likely timeout parameters are identified, the keep-alive function may choose one or more parameters from the identified likely timeout parameters based on the values of the likely timeout parameters. For example, the first application may have separate environment variables/parameters associated with the application timeout clock, a message acknowledgement receipt timeout clock, etc., all of which have the term "timeout" in their names and all of which have numerical values. In such a situation, the keep-alive function may conservatively select the likely timeout parameter having the smallest value as the value to use in estimating when the first application will expire.

In alternative embodiments, the user terminal 1 may access information precisely identifying the timeout parameter needed. In such a case, the request may specifically identify the timeout parameter sought. Timeout parameter identification information may include lists of names for timeout parameters used by functions that the user terminal 1 is capable of launching, timeout parameters commonly used in applications, and the like.

Timeout function information sought by the keep-alive function may include the default, user-specified and/or system or network administrator-specified timeout period for the first application, a current application timeout clock value, and the type of keep-alive input that would cause the application timeout clock to be reset (for example, a specified input format or content). Based on this information, the keep-alive function may set its own function timeout clock (the "process clock") to an initial state, as shown in block 205. The function timeout clock may be synchronized with the application timeout clock. The value of the function timeout clock may be set so that the function timeout clock will expire before the application timeout clock expires. As with the application timeout clock, the function timeout clock may be set to an initial state of zero and be incremented or the process clock may be set to an initial state equal to the timeout period value and be decremented. Alternatively, the keep-alive function may rely solely on the application timeout clock. However, this type of embodiment may suffer from communication delays in systems involving distributed applications and/or a long-distance or shared communication network 4.

In some embodiments of the invention, the keep-alive process may not gather first application timeout function information. The keep-alive process may be prevented from collecting such information due to security measures implemented by the connected computer 3 or the amount or type of available information may be difficult to collect or process. In these embodiments of the invention, the keep-alive function may set a function timeout clock to a duration known or believed to be shorter than the timeout process clock.

In an embodiment of the invention, the keep-alive process may use collected timeout information related to keep-alive input type to create a customized or application-specific, keep-alive input. For example, if the first application is an application for downloading Web page content, the keep-alive input may contain instructions to "refresh" the content.

As shown by block 206 and 207, when the process clock nears the timeout period value if the clock is being incremented or zero if the clock is being decremented, the keep-alive process transmits a keep-alive input to the first application. The keep-alive process may create the keep-alive input based upon the application timeout information collected in the step shown in block 204. The process clock value at which a keep-alive input will be transmitted may be set by the process so as to compensate for synchronization errors between the process clock and the application timeout clock.

In embodiments of the invention in which the keep-alive process maintains an independent function timeout clock, the function timeout clock may be reset each time a keep-alive input is transmitted to the application or, as shown in block 208, only after it has been verified that the application timeout clock has been reset. In other words, some embodiments of the invention may omit block 208 and automatically reset the function timeout clock upon transmission of the keep-alive input. In order to verify that the application timeout clock has been reset, the keep-alive function may send a request for timeout parameter information to the connected computer 3 as part of the keep-alive input or in a separate transmission.

Figure 4:
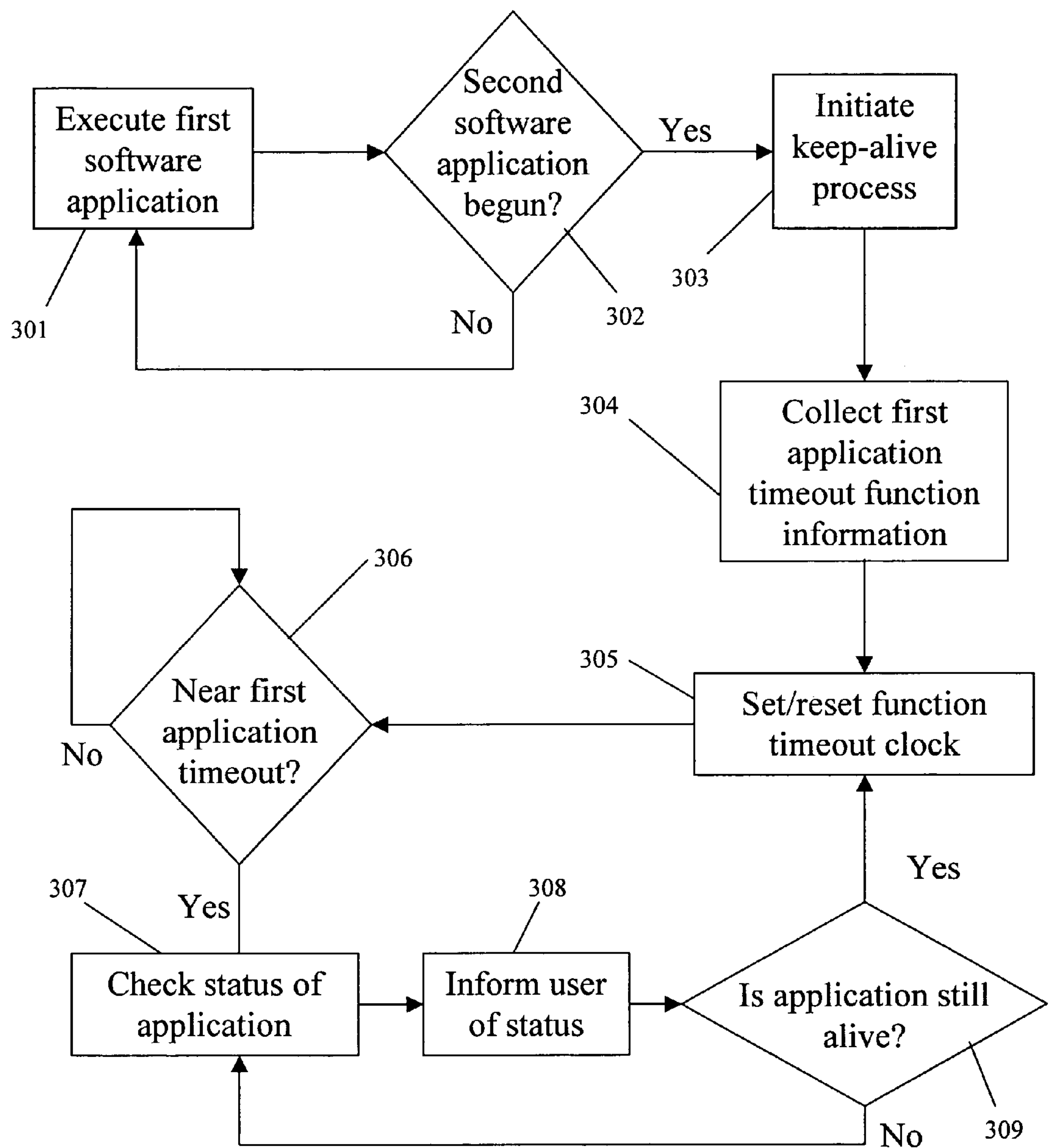
FIG. 4 is a flowchart illustrating the logical process that may be executed by a keep-alive process according to another embodiment of the present invention.

FIG. 4 is a flowchart depicting the process that may be followed by an alternative embodiment of the invention. Unlike the embodiment depicted in FIG. 3, in this embodiment of the invention, the keep-alive function does not cause a keep-alive input to be sent to the first application host. Instead, the keep-alive function checks the status of the first application, as shown in block 307, and informs the user of the status of the first application, as shown in block 308. The keep-alive function may check the status of the first application by sending a status query message to the first application host. In a client-server embodiment of the invention, the status query message may include a session and/or application identifier. In block 309, the keep-alive function may then decide whether to reset the function timeout clock based on whether the first application is still alive. The frequency at which status query messages are sent to the first application host may be set so as to be shorter than the duration of the timeout clock for most applications or for all applications that the user terminal 1 may be capable of causing to launch. Status query messages may be transmitted when the keep-alive function timeout clock has reached a specified state (e.g., a particular time value remaining). The keep-alive function timeout clock may be independent from a first application timeout clock that may be maintained by the first application host. In block 309, the keep-alive function may decide whether to reset the keep-alive function timeout clock based upon the status of the application, e.g., if the application is still alive. In alternative embodiments of the invention, if the application is found to have been terminated, the keep-alive function may terminate itself. In an embodiment of the invention, the status query message may include a request for first application timeout function information.

While the description above refers to particular embodiments of the present invention, it should be readily apparent to people of ordinary skill in the art that a number of modifications may be made without departing from the spirit thereof. The accompanying claims are intended to cover such modifications as would fall within the true spirit and scope of the invention. The presently disclosed embodiments are, therefore, to be considered in all respects as illustrative and not restrictive, the scope of the invention being indicated by the appended claims rather than the foregoing description. All changes that come within the meaning of and range of equivalency of the claims are intended to be embraced therein.

What is claimed is:

1. An application management system comprising:

a first computer configured to host an application;

a user terminal;

a communication network, said first computer coupled to said user terminal through said communication network;

an computer-executable first application, wherein at least a portion of said first application is executed by said first computer and at last a second portion of the first application being executed at said user terminal;

a computer-executable second application, wherein said second application is executed at said user terminal; and a computer-executable keep-alive function, to collect first application timeout information related to said first application to formulate a keep-alive input based on the collected first application timeout information; and to transmit said keep-alive input to said first computer.

2. The application management system according to claim 1, wherein said first computer is a server, and said user terminal establishes communication with said server by sending said server a session initiation request.

3. The application management system according to claim 1, wherein said keep-alive input has a content and a format, and at least one of said content and said format is based on said timeout information collected by said keep-alive function.

4. The application management system according to claim 1, wherein said first application timeout information includes information related to a timeout period.

5. The application management system according to claim 1, wherein:

said first computer maintains an application timeout clock, a timeout function terminating said application when said timeout clock reaches a specified state and said application timeout clock being reset when said first computer receives the keep-alive input, and said timeout information includes information related to a current state of said timeout clock.

6. The application management system according to claim 1, wherein said keep-alive function maintains a keep-alive function timeout clock and said keep-alive input is transmitted to said first computer when said keep-alive function timeout clock reaches a specified state.

7. The application management system according to claim 6, wherein:

said first computer maintains an application timeout clock, a timeout function terminating said first application when said timeout clock reaches a specified state and said application timeout clock being reset when said first computer receives the keep-alive input, said timeout information includes information related to a current state of said application timeout clock, and said keep-alive function timeout clock is set based on said timeout information.

8. An application management system according to claim 7, wherein said keep-alive function timeout clock is reset when the application timeout clock has been reset.

9. An application management system according to claim 7, wherein said keep-alive function timeout clock is reset when the user performs an action to keep said application alive.

10. The application management system according to claim 1, wherein said keep-alive function causes a query to be sent to a user seeking authorization from said user to transmit said keep-alive input to said first computer.

11. The application management system of claim 1, wherein the keep-alive function is housed on a computing device that is not the first computer or the user terminal.

12. The application management system of claim 1, wherein the keep-alive function is housed on the user terminal.

13. The application management system of claim 1, wherein at least a portion of the second application is executed by said first computer.

14. The application management system of claim 1, wherein the keep-alive function transmits a keep-alive information request to the first computer in order to collect the first application timeout information.

15. The application management system of claim 1, wherein the first application is a downloading web page application and the keep-alive input transmitted to the first computer includes instructions to refresh the content of a web page.

16. The application management system of claim 1, wherein the keep-alive function transmits a keep-alive information request to the user terminal in order to collect the first application timeout information.

17. A method of managing a plurality of applications, said method comprising:

executing a first application, at least a portion of the first application being executed by a first computer and at least a second portion of the first application being executed at a user terminal, the first computer and the user terminal being coupled via a network;

executing a second application at the user terminal;

collecting, by a keep-alive function, first application timeout information related to said first application;

formulating a keep-alive input based on the collected timeout information; and transmitting said keep-alive input from said user terminal to said first computer.

18. The method of managing an application according to claim 17, wherein said application timeout information includes information related to an application timeout clock maintained by said first computer and related to said first application.

19. The method of managing an application according to claim 18, wherein said keep-alive input is transmitted based on a state of said application timeout clock.

20. The method claim 18, further including, by said keep-alive function, maintaining a keep-alive function timeout clock related to said first application timeout clock, and wherein said keep-alive input is transmitted based on a state of said keep-alive function timeout clock.

21. The method of claim 17, wherein said application timeout includes information related to a required content or a required format for said keep-alive input, and said keep alive input is formulated based on said application timeout information.

22. The method of claim 17, wherein said application timeout information includes information related to a required format for said keep-alive input, and said keep-alive input is formulated based on said application timeout information.

23. The method of claim 17, further including transmitting a keep-alive information request to the first computer in order to collect the first application timeout information.

24. The method of claim 23, wherein the keep-alive information request is a request identifying environmental variables or parameters associated with the time-out of the first application and a response includes the environmental variables or parameters.

25. The method of claim 24, wherein the keep-alive function sorts through the environmental variables or parameters to identify timeout parameters.

26. The method of claim 24, further including sorting, by the keep-alive function, through the environmental variables or parameters to identify likely timeout parameters and determining whether multiple likely timeout parameters are present.

27. The method of claim 26, further including selecting one of the multiple likely timeout parameters having a smallest value.

* * * * *